(12) United States Patent
Mazzei

(10) Patent No.: US 6,173,526 B1
(45) Date of Patent: *Jan. 16, 2001

(54) BENEFICIATION OF SOIL WITH DISSOLVED OXYGEN FOR GROWING CROPS

(76) Inventor: Angelo L. Mazzei, 11101 Mountain View Rd., Bakersfield, CA (US) 93307

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/021,721

(22) Filed: Feb. 10, 1998

(51) Int. Cl.[7] .................................................. A01G 29/00
(52) U.S. Cl. ................................................................ 47/48.5
(58) Field of Search ..................... 47/1.01 F, 59, 47/62, 48.5, 58; 405/37, 45; 134/10; 61/13; 95/261; 210/198.1

(56) References Cited

U.S. PATENT DOCUMENTS

| | | | |
|---|---|---|---|
| 1,200,869 | * 10/1916 | Rife | 47/48.5 |
| 1,677,153 | * 7/1928 | Spencer | 47/58.1 |
| 3,046,747 | * 7/1962 | Timpe | 47/1.01 F |
| 3,518,831 | * 7/1970 | Tibbals et al. | 47/48.5 |
| 3,762,170 | * 10/1973 | Fitzhugh | 61/13 |
| 4,123,800 | * 10/1978 | Mazzei | 366/150 |
| 5,494,576 | * 2/1996 | Hoppe et al. | 210/198.1 |
| 5,560,831 | * 10/1996 | Bladen et al. | 210/704 |
| 5,561,944 | * 10/1996 | Ismail et al. | 47/58 |
| 5,674,312 | * 10/1997 | Mazzei | 95/261 |
| 5,697,187 | * 12/1997 | Persinger | 47/58 |
| 5,759,286 | * 6/1998 | Sarver | 134/10 |
| 5,863,128 | * 1/1999 | Mazzei | 366/163.2 |

OTHER PUBLICATIONS

New Ideas In Aeration, Irrigation Journal Jul./Aug. 1990 pp. 12–17.

Author unavailable; New Ideas in Aeration, Irrigation Journal Jul./Aug. 1990, pp. 12–17.*

* cited by examiner

Primary Examiner—Michael J. Carone
Assistant Examiner—Francis T. Palo
(74) Attorney, Agent, or Firm—Donald D. Mon

(57) ABSTRACT

Method and apparatus for sub-surface injection of irrigation water infused with treatment gas such as air or oxygen. The infusion of gas into the water is by the use of a cavitating mixer-injector, and the resulting infused water under pressure is conveyed under pressure to the roots of a crop, where it is discharged in the root zone beneath the surface of the soil. The released effluent is water containing dissolved gas at atmospheric pressure, gas released from the water when the pressure was released, and gas in the micro-bubbles.

18 Claims, 3 Drawing Sheets

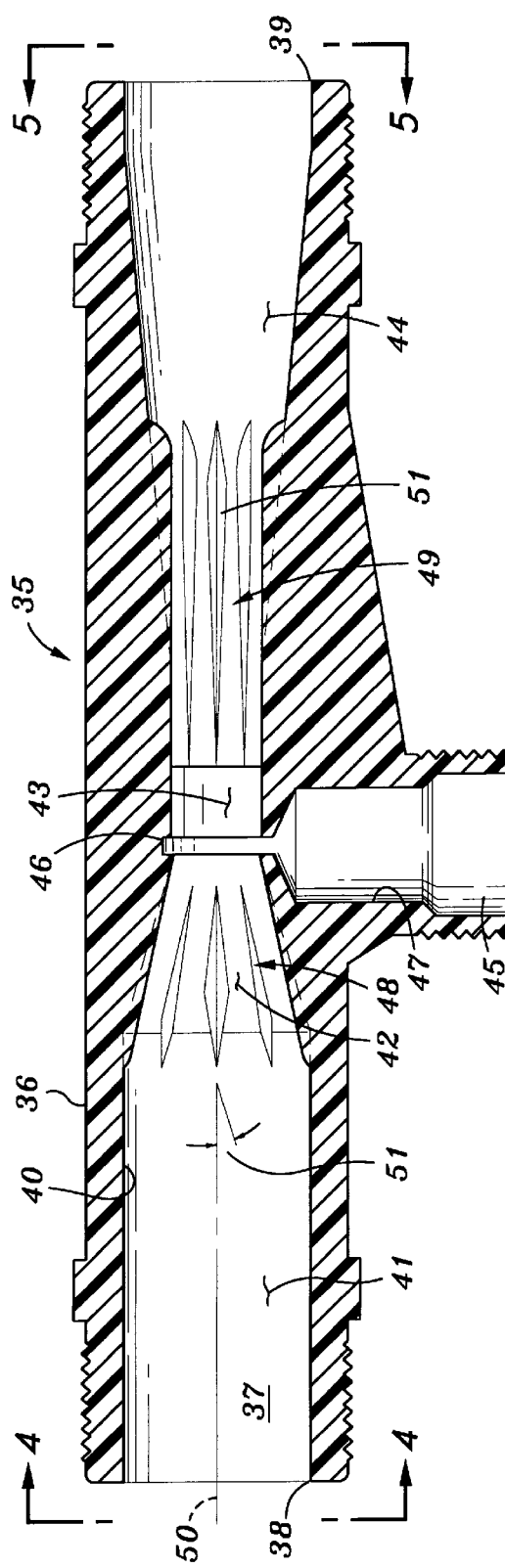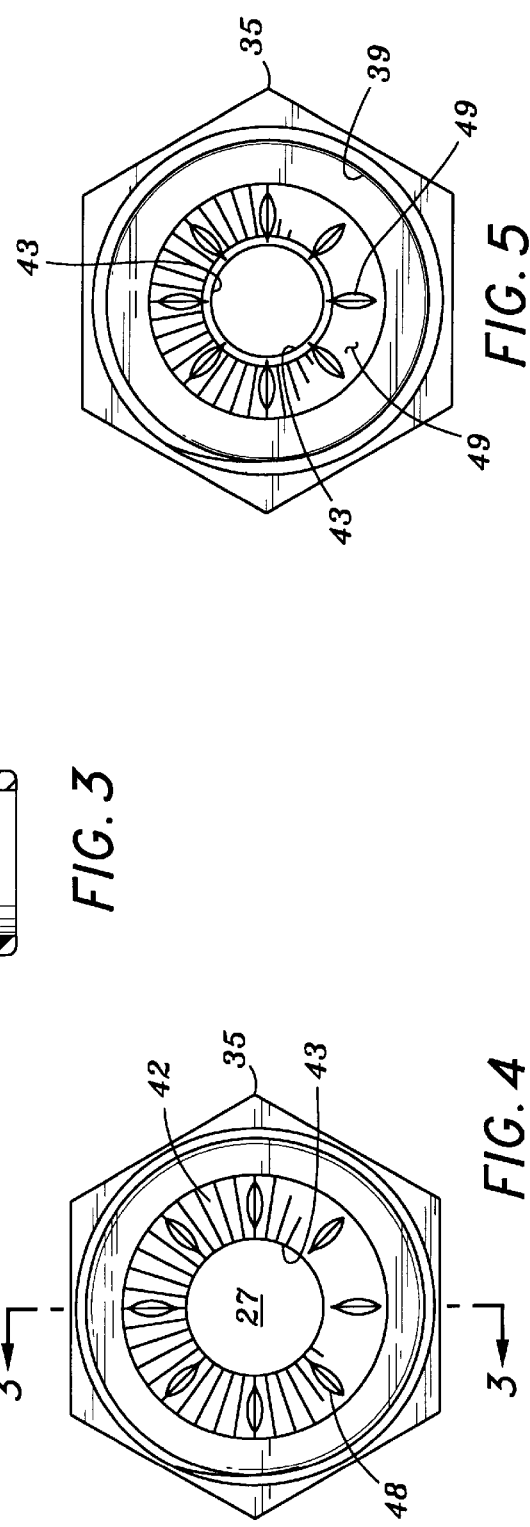

BENEFICIATION OF SOIL WITH DISSOLVED OXYGEN FOR GROWING CROPS

FIELD OF THE INVENTION

This invention relates to the beneficiation of soil in which a crop is grown by supplying beneficial gases to the root region.

BACKGROUND OF THE INVENTION

Growing plants require water, oxygen and potentially other gases to support their life cycle. The water for most crops is derived from interstices in soil, which obtain it from rainfall or irrigation. Oxygen and other gases are obtained from the interstices, either from atmospheric gases which have migrated into the soil or from water in which the gases are dissolved. Although many gases can be beneficial to various crops, oxygen is one of the more important ones, and hence it will be dealt with specifically in this discussion, but this invention is not to be limited to the beneficial affects of oxygen only.

Generally, the concentration of oxygen or other gases in irrigation water is limited to that which is dissolved in accordance with Henry's Law. This is adequate for growth of crops. Farmers and growers of plants are fully aware of the range of wetness that a plant can tolerate. If the soil is maintained too wet for a substantial length of time, it will partially suffocate the microbial activity necessary for plant food conversion for plant uptake. It will, in effect drown. Too long a dry period will result in a lack of moisture to support plant transpiration even though there is plenty of oxygen in the soil.

Accordingly, with present practices, a plant grows best when it is alternately wetted and permitted to approach dryness. The grower attempts to provide adequate moisture and adequate oxygen to support varying transpiration ratios due to fluctuating weather conditions. Commercial intensive agricultural practice supplies oxygen as a function of the correct supply of oxygen dissolved in water, and as a function of air which is drawn into the soil as water is withdrawn from the interstitial spaces in the soil. However these sources can be quite variable. Well water, for example, tends to have less dissolved oxygen, and often contains undesirable other gases. The oxygen content in water supplied in ditches and furrows can vary depending on water temperatures and ambient conditions.

It is an object of this invention to control and to improve the supply of oxygen to the soil, and thereby improve the growth of the plant or crop. The terms "plant" and "crop" are used interchangeably herein.

This is a fundamental problem, and efforts have been made and suggested to improve the oxygen supply by aerating irrigation water. This can indeed increase the oxygen concentration in the water, but it does not address the issue of what gas content actually reaches all plants in an area of significant size. Previous efforts have achieved some disappointingly limited improvement. For example they have not provided an optimal increase in production by weight, uniform improvement over a substantial area, or significant advancement of maturity of the plants. Their small improvement has been commercially insignificant.

This invention does provide these improvements. For example, adjacent plots of land near Bakersfield, California were planted with bell pepper plants spaced about 12-14 inches apart, along raised rows about 620 feet long between furrows spaced about 40 inches apart. A test plot was prepared according to this invention, as will be described below. The control plot was planted the same way, with an identical irrigation system but without the air supply of this invention. The systems were operated identically.

The results were surprisingly and unpredictably favorable. For example, it was found that the peppers reached a given point of maturity with this invention about one week sooner than peppers in the control plot. This was confirmed by observing the presence of a larger proportion of red peppers to green peppers in the test plot sooner than in the control plot. This is not a small matter. Especially at the start of a season, the earlier produce commands immediate purchase and at a premium price. This premium goes straight to the bottom line as profit. In addition an increase in production in weight of crops over the full season of about 5.6% over the control plot was noted, which also is a direct profit from this invention.

Because this invention's effects are substantially uniform over the entire field, maximum production from a plot of significant size can be anticipated. While bell peppers are given as an example of the results of using this invention, other crops may expect beneficial results, also.

As a further advantage, the plants are less stressed while growing and producing. The average stress index of the control plot for the season was about −5.52, while the test plots had an index of about −5.76. A larger negative number is the better.

It is an object of this invention to provide a practical means to beneficiate the soil for the above purpose. By the term "beneficiate" is meant addition of a substance to improve the soil's microbial activity for better plant food uptake as a total body by the injection of air/oxygen into the vital root zone area of the plant including moisture for the intended purpose. It is not used in the sense of the addition of a chemical such as gypsum or fertilizer which is used to change the chemical constituents of the soil itself.

BRIEF DESCRIPTION OF THE INVENTION

A system to beneficiate soil according to this invention is intended to supply water and air/oxygen along with other potentially beneficial gases to the subsurface root region of the plant. It is intended to be useful over a substantial area of cropland. As an example, for an area of 4.8 acres, with rows as long as 620 feet, and from a single supply, as many as 98 of these rows can readily be treated by this invention. Treated water is to be released beneath the surface of the soil or beneath a covering for the soil such as a mulch. A plastic sheet is regarded as a mulch, although its principal purpose is to control weeds.

An example of a system for this purpose is drip irrigation in which water under system pressure is released through spaced-apart emitters directly into the subsurface soil near the plant rather than being applied to the surface or in furrows. Until the water is released from the emitter, it remains under system pressure so that it contains more dissolved oxygen and other gases than it would under atmospheric pressure, and it will al so contain very small micro bubbles of oxygen and other gases such as nitrogen which have not dissolved, especially when air is used as the source of oxygen. As a consequence, when this water is released from system pressure to atmospheric pressure, the released water will then carry a dissolved amount of oxygen respective to this lower pressure, and will release in the soil. the excess oxygen which was dissolved at system pressure. It will also release such gases including oxygen as may have exited in micro bubbles.

Importantly, because the system is under pressure, the quality of the mixture of oxygen-rich water and micro-bubbles remains substantially uniform throughout the entire pressured system. Some coalescencing of the micro-bubbles can be expected, but because of their small size and dispersion, coalescence into major bubbles will not be appreciable. Therefore the water delivered through all exit orifices is substantially uniform so that every plant will be treated consistently.

It will be noted that this arrangement will compensate for the absence of oxygen from the atmosphere into the soil when covered by an impermeable plastic sheet (mulch).

According to this invention, oxygen, oxygen containing gases such as air, and other gases beneficial for soil treatment, will be injected into the water stream through a mixer-injector. The mixer-injector has a flow passage therethrough with a constricting portion, an injection portion, and an expanding portion in that order. Treatment gas enters the injection portion through an injection port.

The mixer-injector is a cavitating type which produces a reduced pressure in the injection portion, and turbulence in the injection portion. The turbulence disperses the treatment gas throughout the stream. It also reduces the size of the bubbles while it also increases their number.

According to a preferred but optional feature of this invention, the turbulence, distribution and reduction in bubble size may be improved by providing twisting vanes in the constricting portion and straightening vanes in the expanding portion. The stream from the expanding portion proceeds to a user system which may include one or more manifolds, and from there through tubing to points of discharge. It is maintained under pressure until it leaves the tubing. The rate of flow through this system and its length allow sufficient time for the oxygen or other gases to be dissolved to saturation level. The bubbles produced by this mixer-injector are small enough that they do not appreciably coalesce or rise to a surface. They tend to be discharged through the emitter along with the water.

According to a preferred but optional feature of the invention, the treatment gas is air, used for its oxygen content, as well as other potentially beneficial gases.

The above and other features of this invention will be fully understood from the following detailed description and the accompanying drawings, in which:

BRIEF DESCRIPTION OF THE DRAWINGS

FIG. 3 is an axial cross-section of the mixer-injector used in this invention;

FIG. 4 is a left hand end view of FIG. 3;

FIG. 5 is a right hand end view of FIG. 3; and

DETAILED DESCRIPTION OF THE INVENTION

Figure 1:
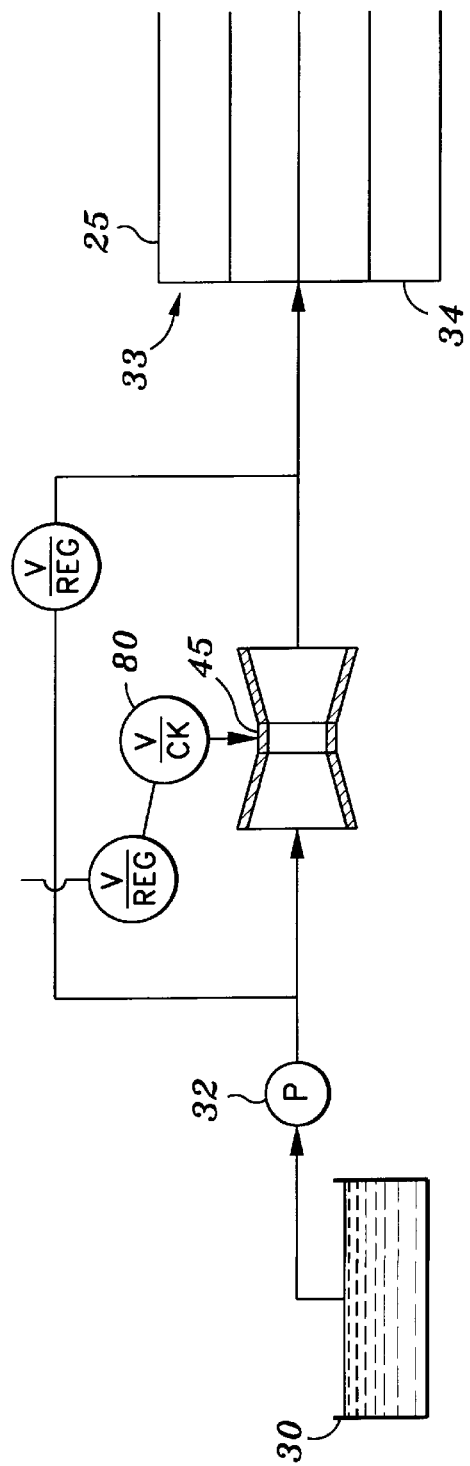
FIG. 1 is a schematic illustration of an irrigation system according to the preferred embodiment of this invention.
Figure 2:
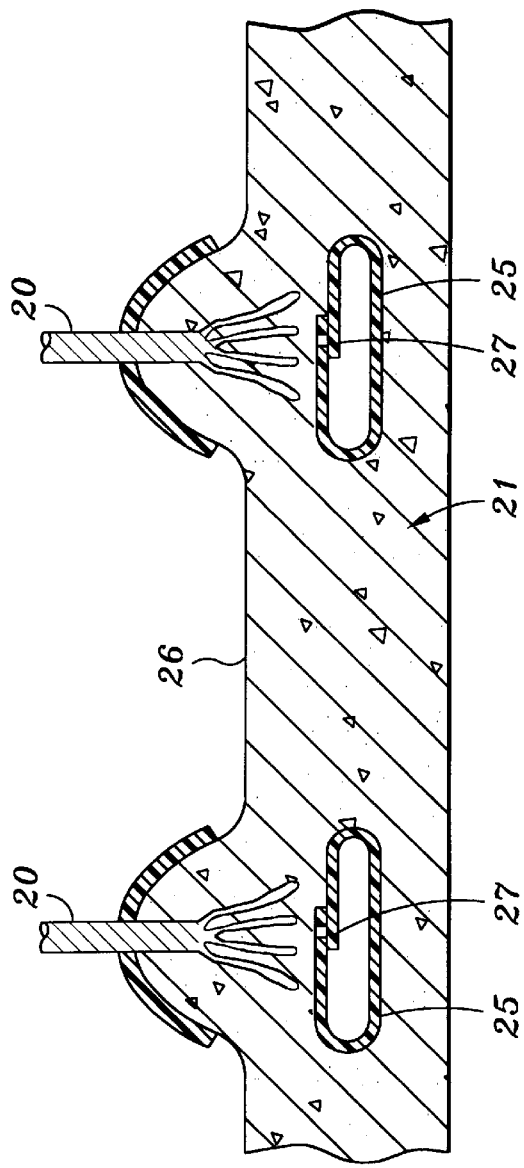
FIG. 2 is a schematic cross-section of a localized region where water is being emitted.

The object of this invention is to provide a supply of water and oxygen and/or other potentially beneficial gases to soil in the root area of a growing plant. The presently-preferred example of its use is in drip irrigation where, as shown in FIG. 2, a plant 20 is grown in soil 21 having a surface 22. For some crops, a plastic sheet 23 (regarded as a "mulch" for its weed resisting capability) or organic mulch is applied over the surface of the soil near the plant. Water supplied by this system will ordinarily be discharged about 6–10 inches below the soil surface.

Figure 6:
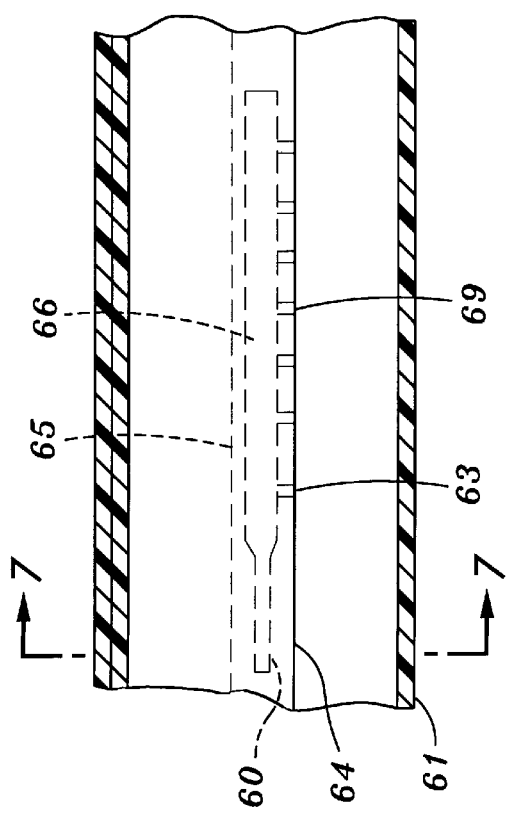
FIG. 6 is a longitudinal cross-section of a fragment of typical drip irrigation tubing showing an emitter suitable for use with this invention.
Figure 7:
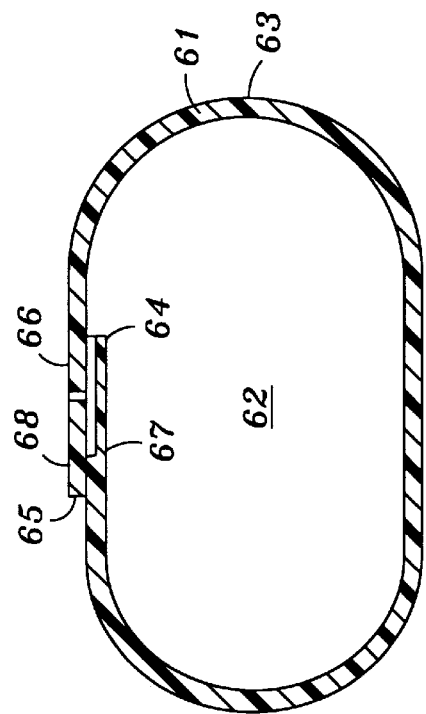
FIG. 7 is a cross-section taken at line 7—7 in FIG. 6.

As shown, a drip irrigation tubing 25 extends along a row 26. At intervals its wall is pierced by emitters 60 (FIG. 6). An emitter is simply an orifice of some kind through which water will flow from the tubing into the soil region at a regulated rate, under designated system pressure. There is a pressure drop across the emitters from system pressure, usually about 10–20 psig to atmospheric pressure.

The pressure drop at the discharge sites is of considerable importance to this invention. The reason is the higher concentration of oxygen and/or other gases that exist in the water at the higher pressure according to Henry's law. However, there is more to it than that, because frequently agricultural water supplies are not fully saturated with oxygen. In this invention, super saturation at atmospheric and system pressure can be assured, so that extra oxygen will be released from solution as the pressure drops, plus additional oxygen in the gas content of the micro bubbles that are produced. This water stream is very rich in the treatment gas.

A water source 30, such as a well, a pond, or a water main supplies water to be pressurized by a pump 32 to system pressure. If the source is a main and pressure in the main is adequate, a pump will be unnecessary. Its output is provided to a distribution system 33 which includes such conventional valves, regulators, and other controls as may be suitable. The system may include headers 34 extending along the heads of the rows 26 of crops. From the headers, flexible drip irrigation tubings 25 extend along the rows or to any desired location where the emitters 27 are to be placed. Applications other than in rows is contemplated, for example in groups of emitters around a tree, and a series of trees.

The mixer-injector 35, best shown in FIG. 3 optimally produces the desired beneficiated water. It receives water from the pump and passes it to the distribution system. Injector mixers such as those shown in Mazzei U.S. Pat. No. 4,123,800, issued Oct. 31, 1978 are cavitating types which will in fact increase the oxygen and/or other gases content of water by drawing gas into the stream, and creating micro-bubbles. Such mixer-injectors are useful in this invention. However, the increased turbulence and shear in the illustrated mixer-injector produces smaller micro-bubbles and distributes them better, thereby providing an improved and more stable mix. Both types of mixer-injectors assure that oxygen and/or other gas saturation can be attained, and that the bubbles will be so small that they will minimally gas-out of the water in the time span generally involved in flow through systems such as these, but the mixer-injector shown in FIG. 3 provides surprisingly-improved results.

Full details of mixer-injector 35 will be found in applicant's presently co-pending United States patent application filed Dec. 4, 1997, Ser. No. 08/984,930 filed Dec. 7, 1997, now U.S. Pat. No. 5,863,128 issued Jan. 26, 1999 entitled "Mixer-Injector With Twisting and Straightening Vanes"which is incorporated herein in its entirety for its detailed showing of the construction and theory of operation of this mixer-injector. For purposes of this invention, it is sufficient to describe its basic elements.

Full details of a less-effective, but still useful mixer-injector for use with this invention will be found in the said Mazzei U.S. Pat. No. 4,123,800, which is incorporated herein in its entirety for its showing of such a mixer-injector. It lacks certain vanes yet to be described, which provide important advantages.

Mixer-injector 35 has a body 36 with a flow passage 37 extending from an entry port 38 to an exit port 39. An internal wall 40 forming the flow passage includes, from the entry port in this order, a cylindrical entry portion 41, a constricting portion 42, an injection portion 43, and an expanding portion 44 which terminates at exit port 39.

An injection port 45 enter the injection portion near to the constricting portion. It preferably exists as a circumferential groove 46 in the internal wall, communicating with a passage 47 that receives treatment gas to be provided to the stream in the flow passage, for example from atmospheric air. A metering valve 55 and a check valve 56 are placed in passage 47 to provide a unidirectional flow of the correct amount of gas.

It is convenient to regulate the pressure and flow rate by means of establishing a flow and pressure drop through a regulator valve 58 (which may be a flow restrictors instead) in a by-pass passage 59 across the mixer-injector.

To this point, the mixer-injector shown in the said Mazzei '800 patent is described, and is useful. However, additional features as shown in the said Mazzei patent application provides importantly improved performance. These features are twisting vanes 48 in the constricting portion, and straightening vanes 49 in the expanding portion.

The twisting vanes 48 are provided as a group (eight is a useful number) of individual vanes with crests which as they extend along the central axis 50 of the flow passage also extend at an acute angle 51 to a plane passed through them and which includes the central axis. They rise from the entry portion into the constricting portion. They do not intersect the central axis. They give a twist to the outer region of the stream, so that when it crosses the injection port it has an increased turbulence caused by the confluence of the central "core" of the stream (which is not twisted) and the outer portion (which is twisted). This increased turbulence results in a more thorough mixing of the water and the treatment gas, and the reduction of size of the micro-bubbles, all to the advantage of this process.

Once this is attained, it is advantageous for the turbulence to be reduced, while still further shearing the micro-bubbles. This is accomplished by the group of straightening vanes 49, which extend along the expanding portion. They have crests 51 that are preferably parallel to the central axis, and are spaced apart from it. From exit port 39, the stream enters the distribution system extending to the plants.

As previously stated, emitters 27 are placed along the length of the tubing. Their characteristic is to provide for a slow bleed of water from the tubing into the subsoil. Such emitters are well-known and of several types. They constitute, in effect, a bleed valve that permits a very limited rate of flow of fluid therethrough, so the pressure in the tubing is not materially reduced, and the contents remain under pressure throughout the system.

A typical useful emitter 60 is shown formed as part of a drip irrigating tubing 61. In this emitter, the main passage 62 is formed by a wall 63. Longitudinal edges 64, 65 of the wall are overlapped to leave a restricted channel 66 between overlapped margins 67, 68. A series of inlet ports 69 is formed from passage 62 into channel 66. These ports are small and enter at numerous locations along the overlaps. The channel may further restricted by internal diverters or by serpentine passages which further reduce the rate of flow of water through channel 66. At one end of channel 66, a longitudinal slit 71 through the outer overlap releases the water from channel 66 to atmosphere.

There are other types of emitters, including small orifices through the wall of the tubing. Any emitter capable of establishing a regulated rate of fluid flow from passage 62 is acceptable.

The operation of this system will be evident from the foregoing. With the desired throughput of water per unit time decided upon, a suitably sized mixer-injector will be selected and plumbed into the system. The flow through the injection portion will establish a subatmospheric pressure in that portion which will draw treatment gas into the injection portion. The rate of flow of this gas will be adjusted by valve 55 to pass the gas at a suitable flow rate for the purposes intended.

Some treatment gas drawn into the mixer-injector will be dissolved and the remainder will be divided into micro-bubbles as described, and will flow into the system, ultimately to and through the emitters. The drip irrigation tubing is impermeable. Water and gases can leave only through the emitters (or other flow-limiting outlets, of which emitters and orifices are only two examples). The existing fluids have substantially the same water/gas mix at that point as at all other locations in the system downstream from the mixer-injector.

In a system as previously described, water was supplied to a two 2 inch mixer-injector sold by Mazzei Injector Corporation as its part No. 2081. It is constructed as shown in FIG. 3, and as further disclosed in detail in the said Mazzei patent application. Water flowed through the system at the rate of about 260 gallons per minute and air was drawn into it at the rate of approximate 3.5 SCFM. Flow was intermittently supplied, on the average about 2 hours every 3 days and more frequently as the plant grew.

Accordingly, the soil will be beneficiated by the concurrent addition of water and treatment gas. It provides an improvement in growing conditions because it ultimately promotes a healthier plant root. Systems can be provided with the use of this invention which allow far less plant stress under varying weather conditions and watering intervals.

This invention is not to be limited by the embodiments shown in the drawings and described in the description, which are given by way of example and not of limitation, but only in accordance with the scope of the appended claims.

I claim:

1. Apparatus for benefication of soil by infusion of a treatment gas into sub-surface soil with the use of a pressurized irrigation stream, said apparatus comprising:

a cavitating venturi-type mixer-injector having a body with an internal wall forming a flow passage therethrough, said flow passage having a central axis, an inlet, an outlet, and between said inlet and outlet said wall forming a constricting portion of deceasing diameter, a substantially cylindrical injector portion, and an expanding portion having an increasing diameter all as they progress in that order from inlet to outlet, an injection port, said injector port receiving treatment gas from a source of gas for injection into said flow passage to produce a water stream containing micro bubbles of treatment gas:

an impermeable elongated conduit having a length and a peripheral wall forming a longitudinal passage for receiving water and treatment gas from said mixer-injector;

a plurality of flow-restricting outlets disposed along the length of said conduit wall intended for placement beneath the soil surface, said outlets passing through said conduit wall to permit limited flow of water and entrained said mirco-bubbles into said soil from said longitudinal passage without substantial loss of pressure in said conduit;

said mixer-injector adapted to be connected to a source of water under pressure, whereby treatment gas will be infused into said water as it flows through the flow passage in the mixer-injector, and said water will remain under super-atmospheric pressure until after it passes through as said flow restricting outlet to emit water containing treatment gas and said micro bubbles.

2. Apparatus according to claim 1 in which said flow restricting outlets are emitters either internal or external.

3. Apparatus according to claim 1 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

4. Apparatus according to claim 1 in which a plurality of straightening vanes extend along at least a part of the expanding portion, said straightening vanes being parallel to said central axis, but being spaced from said central axis.

5. Apparatus according to claim 4 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

6. Apparatus according to claim 5 in which said flow restricting outlets are emitters, either internal or external.

7. In combination:

crop growing soil in which a rooted crop is to be grown, said soil having a top surface; and apparatus for benefication of said soil by infusion of a treatment gas into sub surface soil with the use of a pressurized irrigation stream of water, said apparatus comprising:

a cavitating venturi-type mixer-injector having a body with an internal wall forming a flow passage therethrough, said flow passage having a central axis, an inlet, an outlet, and between said inlet and outlet said wall forming a constricting portion of decreasing diameter, a substantially cylindrical injector portion, and an expanding portion having an increasing diameter all as they progress in that order from inlet to outlet, an injection port, said injector port receiving treatment gas from a source of gas for injection into said flow passage to produce a water stream containing micro bubbles of said treatment gas;

an impermeable elongated conduit having a length and a peripheral wall forming a longitudinal passage for receiving water and treatment gas from said mixer-injector;

a plurality of flow-restricting outlets disposed along the length of said conduit wall beneath said top surface, passing through said conduit wall to permit limited flow or water and entrained said micro-bubbles into said soil from said longitudinal passage without substantial loss of pressure in said conduit;

said mixer-injector adapted to be connected to a source of water under pressure, whereby treatment gas will be infused into said water as it flows through the flow passage in the mixer-injector, and said water will remain under super atmospheric pressure until after it passes through a said flow-restricting outlet to limit water containing treatment gas and said micro bubbles.

8. Apparatus according to claim 7 in which said flow restricting outlets are emitters, either internal or external.

9. Apparatus according to claim 7 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

10. Apparatus according to claim 7 in which a plurality of straightening vanes extend along at least a part of the expanding portion, said straightening vanes being parallel to said central axis, but being spaced from said central axis.

11. Apparatus according to claim 10 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

12. Apparatus according to claim 11 in which said flow restricting outlets are emitters either internal or external.

13. A method to improve growing conditions for crops which are grown in soil that has a top surface:

utilizing apparatus for beneficiating soil by infusion of a treatment gas into an irrigation stream of water, said apparatus comprising:

a cavitating venturi-type mixer-injector having a body with an internal wall forming a flow passage therethrough, said flow passage having a central axis, an inlet, and outlet, and between said inlet and outlet said wall forming a constricting portion of decreasing diameter, a substantially cylindrical injector portion, and an expanding portion having an increasing diameter all as they progress in that order from inlet to outlet, an injection port, said injector port receiving treatment gas from a source of gas for injection into said flow passage to produce a water stream containing micro bubbles of said treatment gas;

an impermeable elongated conduit having a length and a peripheral wall forming a longitudinal passage for receiving water and treatment gas from said mixer-injector;

a plurality of flow-restricting outlets disposed along the length of said conduit wall, passing through said conduit wall to permit limited flow of water and entrained said micro-bubbles into said soil from said longitudinal passage without substantial loss of pressure in said conduit;

said mixer-injector adapted to be connected to a source of water under pressure, whereby treatment gas will be infused into said water as it flows through the flow passage in the mixer injector, and said water will remain under super atmospheric pressure until after it passes through an emitter buried in conduit beneath said top surface;

forcing a stream of water under pressure into the entry port of said mixer-injector, while admitting treatment gas into said injection portion through said injection port, thereby providing in said longitudinal passage a water stream under atmospheric pressure enriched with treatment gas and micro bubbles of said treatment gas, said emitters permitting limited flow of said stream into said soil.

14. The method according to claim 13 in which said flow restricting outlets are emitters.

15. The method according to claim 13 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

16. The method according to claim 13 in which a plurality of straightening vanes extend along at least a part of the expanding portion, said straightening vanes being parallel to said central axis, but being spaced from said central axis.

17. The method according to claim 16 in which a plurality of twisting vanes extend along at least a part of said constricting portion, said vanes extending axially but at an acute angle relative to an imaginary plane which passes through them and which includes the central axis, said twisting vanes extending toward said central axis, but being spaced from said central axis.

18. Apparatus according to claim 17 in which said flow restricting outlets are emitters, either internal or external.

* * * * *

UNITED STATES PATENT AND TRADEMARK OFFICE
CERTIFICATE OF CORRECTION

PATENT NO. : 6,173,526 B1
DATED : January 16, 2001
INVENTOR(S) : Angelo L. Mazzei It is certified that error appears in the above-identified patent and that said Letters Patent is hereby corrected as shown below:

Column 6,
Line 56, change "deceasing" to -- decreasing --

Column 7,
Line 5, change "mirco-bubbles" to -- micro-bubbles --
Line 13, change "as" to -- a --

Column 8,
Line 4, change "limit" to -- emit --

Signed and Sealed this

Twenty-fourth Day of August, 2004

JON W. DUDAS
*Director of the United States Patent and Trademark Office*